June 17, 1930.  E. J. KEARNEY  1,763,711
MACHINE TOOL ATTACHMENT
Filed April 24, 1923  5 Sheets-Sheet 1
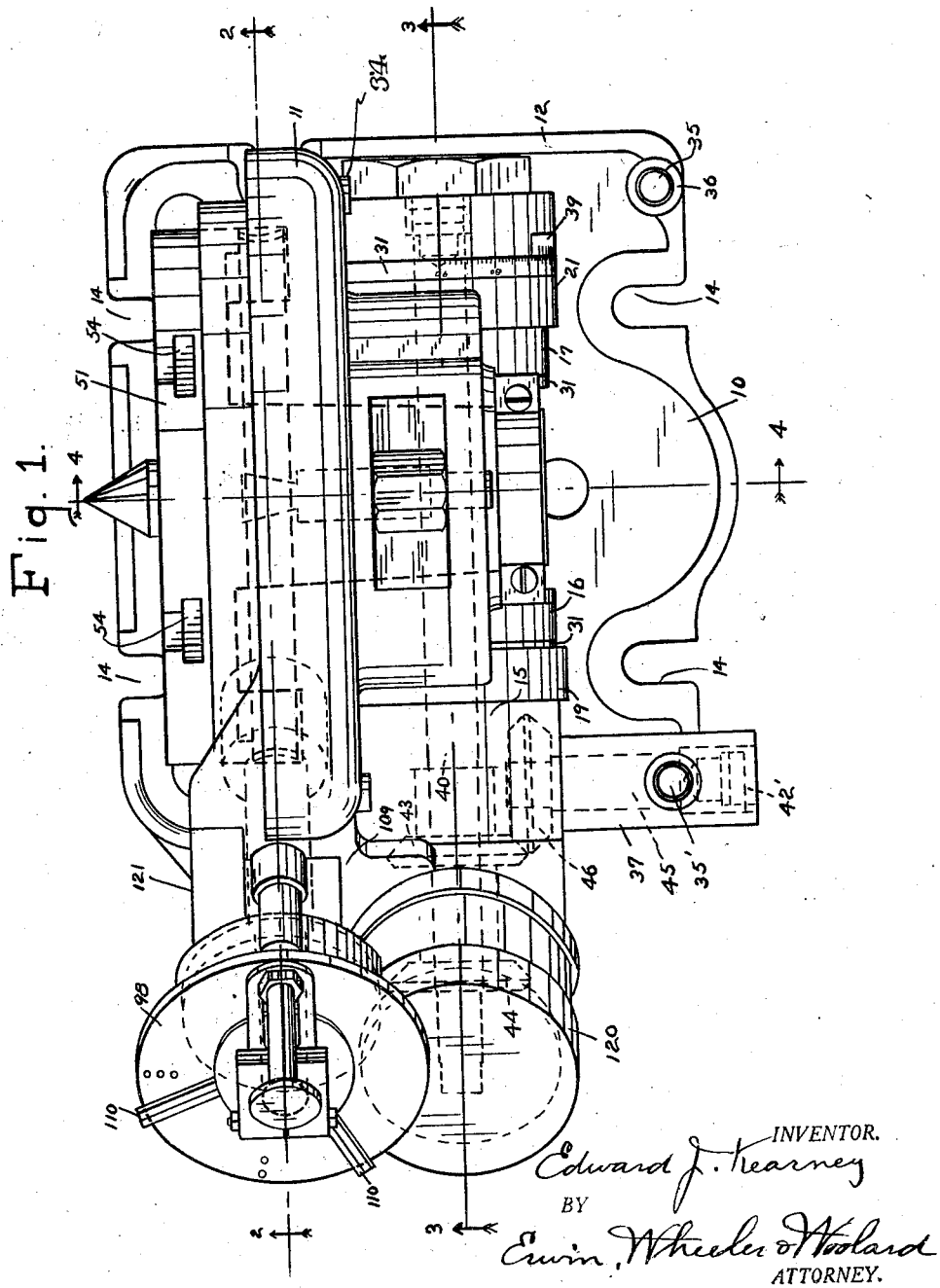
INVENTOR.
Edward J. Kearney
BY
Erwin, Wheeler & Woolard
ATTORNEY.

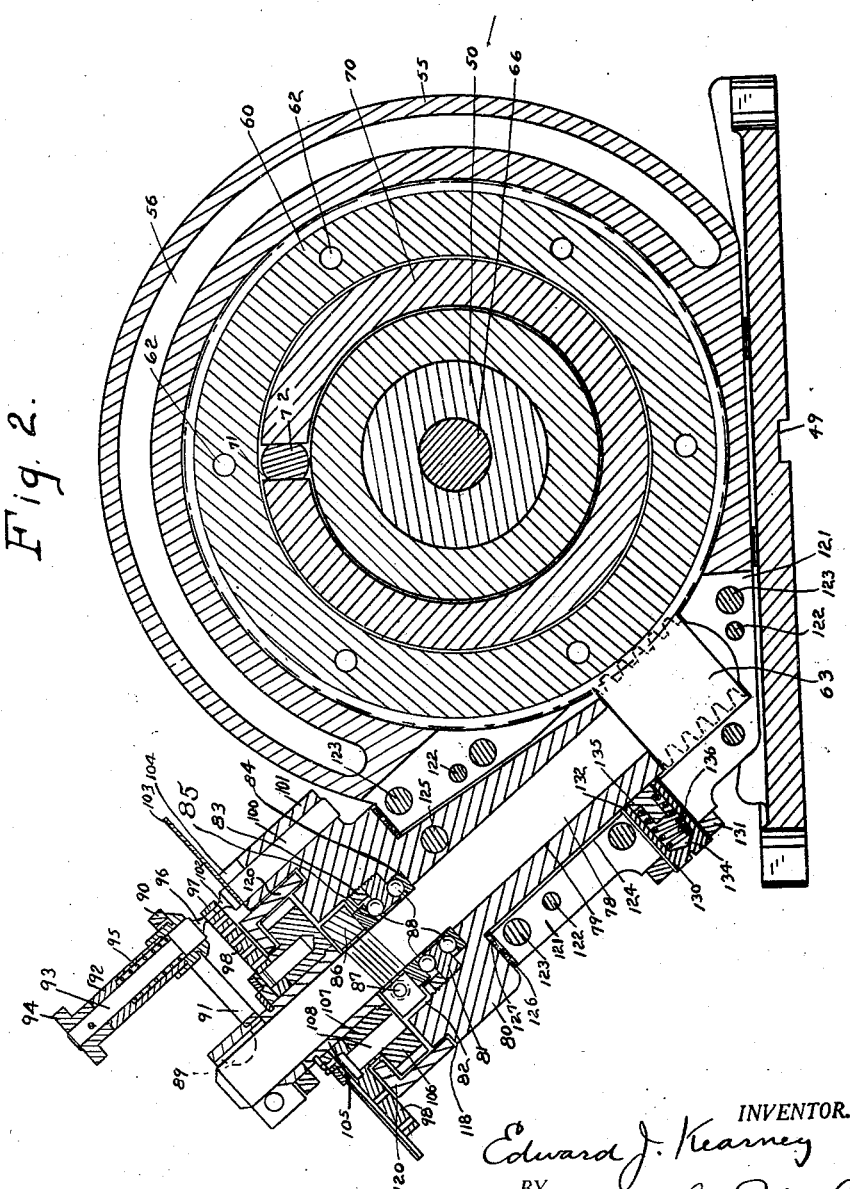

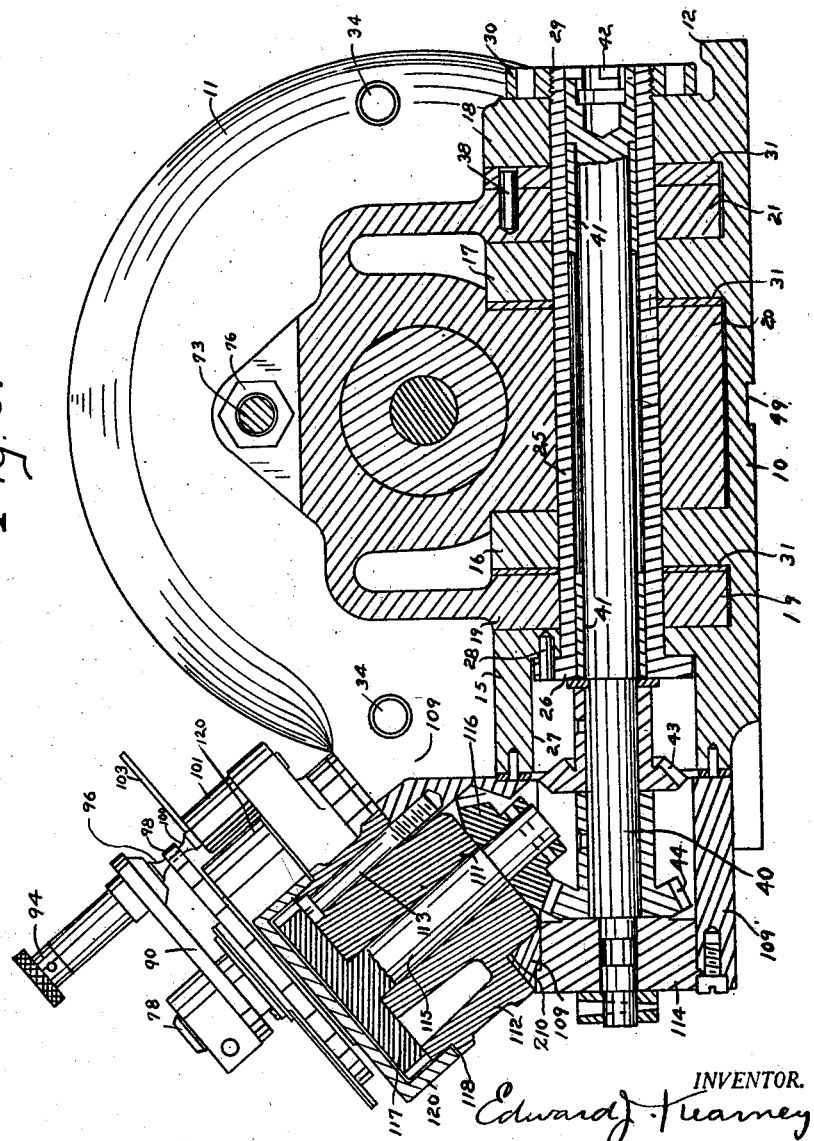

June 17, 1930.                    E. J. KEARNEY                    1,763,711
                             MACHINE TOOL ATTACHMENT
                             Filed April 24, 1923           5 Sheets-Sheet 4
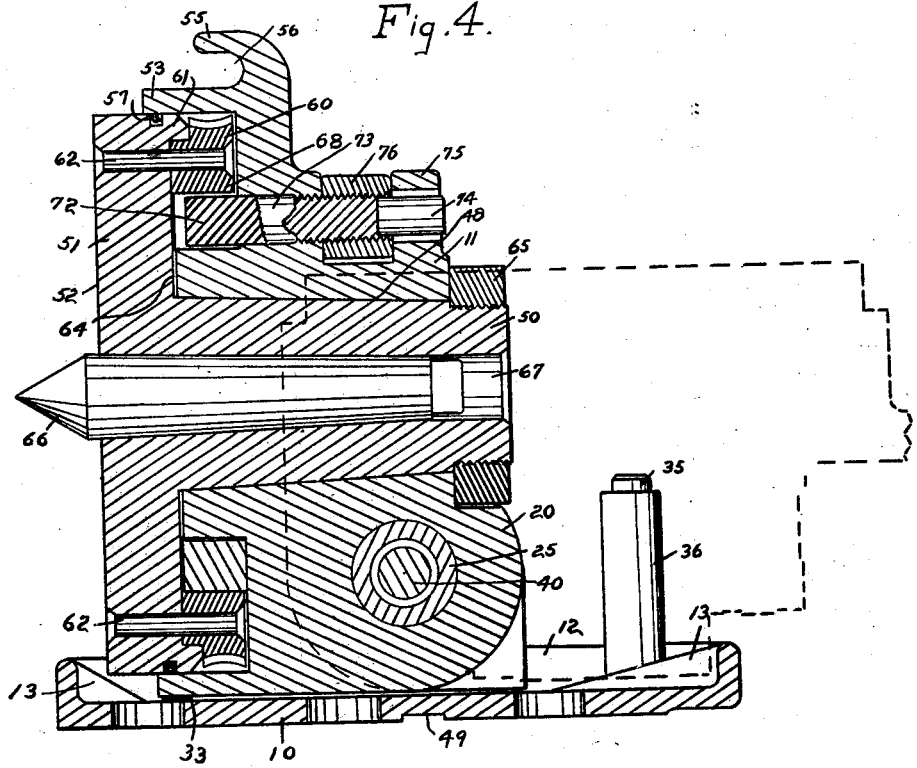
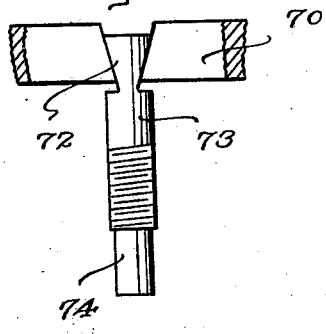

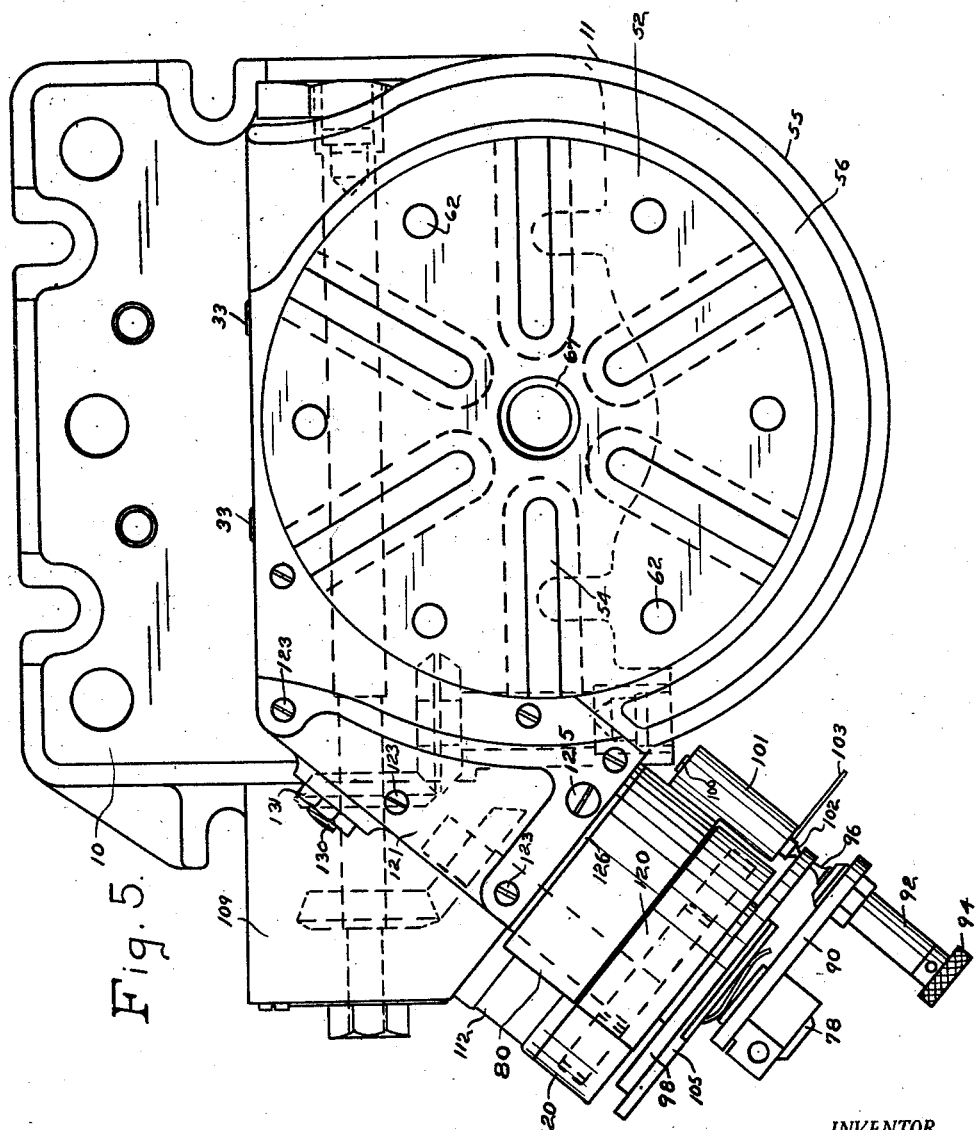

Patented June 17, 1930

1,763,711

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

MACHINE-TOOL ATTACHMENT

Application filed April 24, 1923. Serial No. 634,292.

This invention relates to a machine tool attachment which is primarily a dividing engine but which is so designed as to enable it to perform not only dividing, but also indexing, circular milling and various other related functions.

Broadly stated, it is the primary object of this invention to provide a simple machine tool attachment adapted to perform the several functions of various attachments now in common use.

More particularly stated, it is my object to provide a machine tool attachment having an unusually wide variety of adjustments and thereby adapted to support work in an unusual number of positions and with unusual rigidity; to provide a device wherein the rigidity of the parts in any given position of adjustment is enhanced by an improved and strengthened construction and disposition of clamping devices; to provide a device of which the field of usefulness is greatly widened and its rigidity promoted by reducing to the lowest possible point consistent with accuracy the height of the attachment above a primary supporting structure; and to provide on several different sides of a device of this character an exposed coupling member for the convenient application of power so that the drive to the attachment may be taken either from a variety of sources located in different relative positions about the attachment, or directly from a single source irrespective of the bodily adjustment of the attachment to various positions with respect to said source.

It is a further object of this invention to provide for a work supporting member, a novel and simple clamping device co-operating with the spindle bearing to produce unusual rigidity and operable symmetrically upon such a member in opposite directions from a relatively fixed point, whereby an adjustment of such a member will not be disturbed by the clamping operation.

It is another purpose of this invention to provide a dividing engine of increased accuracy.

It is also my purpose generally to improve, simplify and render more convenient an attachment of the type described.

In the accompanying drawings, the invention is illustrated in one of its practical embodiments, the particular construction disclosed being susceptible of wide modification without departing from the scope or purpose of the invention.

In the drawings:

Figure 1 is a plan view of a device embodying this invention.

Figure 2 is a section taken on line 2—2 of Figure 1.

Figure 3 is a section taken on line 3—3 of Figure 1.

Figure 4 is a section taken on line 4—4 of Figure 1.

Figure 5 is a plan view of the device with the axis of the spindle adjusted to its vertical position and the platen face horizontal.

Figure 6 is a detail view in plan of an expansible braking ring and expanding bolt therefor.

Like parts are identified by the same reference characters throughout the several views.

This device is assembled upon a frame which is made up of two hingedly related parts. For convenience in description, the lower part 10 will hereinafter be termed the base and only the upper part 11 will be known as the frame. The base 10 is adapted for attachment to a machine tool and supports interconnected power transmission shafts providing at a plurality of points exposed coupling members adapted to receive power from a source external to the device. Both the base 10 and frame 11 integrally include complementary knuckles which may be assembled together upon a special pintle to provide a peculiar type of hinge hereinafter to be more particularly described. The frame 11, being hinged as aforesaid to the base 10, carries a novel dividing engine which is in permanently driven relation to the power transmitting shafting of the base despite the angular adjustment of the frame and is of a novel construction adapting it to satisfy the objects specified for this invention.

Having thus generally described the arrangement and function of the major parts of the device, I will now proceed to describe each part in detail.

The base 10 preferably comprises a comparatively thin plate which may be reenforced, if desired, by a peripherally extending flange 12 and by suitable webs 13. Suitable notches 14 in the margins of the base plate 10 are adapted to receive securing bolts of which the heads may be engaged in the T slots of a machine tool table. These notches are preferably so disposed with reference to the slots in the table with which this device is to be associated that the device may be positioned upon the table with its spindle extending either longitudinally or transversely thereof. Grooves 49 intersect at right angles in the bottom of base plate 10 and facilitate positioning the device upon a table.

Upon base 10 is a series of spaced upstanding ears 15, 16, 17, and 18 which are preferably integral therewith. These ears constitute knuckles for the hinged connection to the base of the frame 11. That portion of said frame which lies beneath the spindle hereinafter to be described provides complementary knuckles 19, 20, and 21. The several knuckles 15 to 21, inclusive, are all apertured on a common axis to receive a tubular pintle 25 which is headed at 26 to seat within a recess 27 in the upstanding ear 15 of the base. The pin 28 locks the head 26 of the pintle to the ear 15 and secures the pintle against rotation with respect to the base. The end of pintle 25 which is opposite to head 26 is threaded as shown at 29 to receive a nut 30 which bears against the exterior face of the ear or knuckle 18 of the base.

It will be noted that the knuckle 19 of frame 11 lies between knuckles 15 and 16 of the base; that knuckle 20 of frame 11 lies between knuckles 16 and 17 of the base; and that knuckle 21 of frame 11 lies between knuckles 17 and 18 of the base. It will be noted further that the pintle is headed to seat at one end against the knuckle 15 of the base and bears at its other end the nut 30 which may be tightened against knuckle 18 of the base. The metal of which the base and frame and the several knuckles 15 to 21, inclusive, are constructed is sufficiently resiliently yieldable so that when the nut 30 is tightened upon the threaded portion 29 of pintle 25 the several knuckles of the base will be compressed into binding relation with respect to the complementary knuckles of the frame 11 and the frame will thereby be locked frictionally into any desired position of angular adjustment about said pintle.

The metal of the base, frame, and knuckles is comparatively heavy and of very great strength and rigidity. Consequently, the extent to which it will yield resiliently as aforesaid is very limited and in order to obtain the clamping effect above described, it is necessary to have the abutting surfaces of the several knuckles finished to provide a very accurate fit.

Such a fit might be obtained merely by grinding or scraping or otherwise finishing the surfaces of said knuckles until, eventually, the several knuckles were brought to the desired width and simultaneously each of their surfaces was disposed accurately in the proper plane. Such a procedure, however, involves the obvious practical difficulty that if the desired width were obtained prior to the desired accuracy in the plane abutting surfaces of the knuckles, such surfaces would either have to be allowed to remain inaccurate or else the knuckles would have to be reduced to a width less than that desired. In either event a proper clamping action could not be obtained since the greatest of accuracy in both particulars is required. Accordingly, I have found it expedient in the construction of the hinged joint between the base 10 and frame 11 first to finish the surfaces of the several knuckle members until such surfaces are true. It is contemplated that when these surfaces are properly finished, the thickness of the several knuckles of the frame will be less than that required to fill the space between adjacent knuckles of the base. Thereupon each of such remaining spaces will be filled by an individually prepared washer 31 having exactly the required thickness and having its bearing surfaces finished to the proper degree of perfection.

The obvious practical value of this arrangement lies in the fact that the highest accuracy and the most perfect clamping fit between the several knuckles may be obtained with a minimum loss of time and materials. The surfaces of the washers are not only more accessible and more easily finished than the surfaces of the several knuckles of the device, but it must also be clear that if one of the washers reached the desired width prior to the time when its bearing surfaces were properly and accurately finished, the washer could be discarded and another one prepared with no great loss either of material or of time. Furthermore, each washer is fitted to but one opening independently of other considerations. It would be very impractical to attempt to bring all of the bearing surfaces of the clamp simultaneously to proper finish.

The type of clamp which has been described above is adapted for relief of pressure to permit the frame 11 and related parts to move with great freedom about pintle 25 and can, nevertheless, be actuated to a clamping position wherein the frame and related parts will be held with unusual rigidity in any desired adjustment. The particular construction disclosed has the further advantage that it makes possible an unusual decrease in the height of the attachment. It will be noted that with the parts in the position in which they appear in Figures 1 and 4 of the accompanying drawings the entire device is of a height only very slightly greater than the diameter of the spindle platen itself. The reduction in height becomes even more noticeable when the frame 11 is oscillated about pintle 25 to bring the surface of the spindle horizontal as illustrated in Figure 5 and in broken lines in Figure 4. Rigidity and accuracy are ensured by the provision of a multiplicity of bearing surfaces and a multiplicity of friction surfaces extending transversely clear across the device.

Upon the hinged joint above described, the frame 11 may, when the nut 30 is loosened, be rotated through a full 90° arc about pintle 25 to the position indicated in broken lines in Figure 4 and illustrated in Figure 5.

In order to define accurately the ultimate positions of frame 11, two sets of stops, comprising studs 33 and 34, respectively, are provided upon the frame 11. The former studs seat directly upon base 10 when the frame is in a position such that the spindle therein is horizontal. The studs 34, which are preferably at least two in number, seat upon corresponding studs 35 and 35' borne by the base 10. Stud 35 is mounted at the top of a post 36 of sufficient height to permit the rearwardly extending portions of frame 11 to fall beneath said stud without contacting with the base 10. Stud 35' is disposed at an equivalent height but instead of being mounted upon a post 36 it preferably constitutes an integral part of a housing 37 within which one of the power transmitting drive shafts is located. The surfaces of these studs may readily be finished to define the desired degree of relative movement, whereby the spindle axis may be stopped positively at points wherein it is respectively vertical and horizontal with reference to a horizontal plane represented by the normal position of the base.

It is desirable to provide means for determining visually the angle of adjustment of the frame casting 11 about pintle 25. For this reason one of the washers 31 is preferably graduated in the manner indicated in Figure 1 and secured by dowel pins 38 to the knuckle 21 of frame 11 for rotation therewith. A vernier scale 39 formed on or attached to the knuckle 18 of the base is arranged as shown in Figure 1, to co-operate with the graduated washer 31.

In furtherance of one of the objects of this invention, it is desired to have power applicable to this device at a plurality of points and it is also desired to have at least one of the power shafts extend transversely across the base member 10 from one side to the other thereof without interfering with the freedom of pivotal movement of frame 11 and without necessitating an increase in the height of the device for the sole purpose of accommodating such a transverse shaft. Accordingly, the transverse shaft shown at 40 is disposed axially within pintle 25 of the hinge. In this position, the shaft can extend from one side of the device to the other without interfering with the freedom of movement of frame 11 and without necessitating any increase in the height of the device to avoid such interference.

The power transmitting shaft 40 is preferably journaled in bushings 41 which are spaced axially within the tubular pintle 25. At 42, shaft 40 is formed with an exposed coupling recess adapted to receive a driving connection from a source of power exterior to the device which forms the subject matter of this application. It is immaterial to this invention what that source of power may be. Attention may be called, however, to the fact that if this device is mounted upon a machine tool table such, for example, as that of a milling machine, with the perforated plate and manually operated parts of the dividing engine at the forward margin of such a table, the exposed extremity 42 of shaft 40 will in such a case extend rearwardly in the direction of the column of the milling machine. If, on the other hand, the device be rotated 90° upon the table, the exposed or recessed end 42 of shaft 40 will extend toward the end of the table and will be adapted to receive power transmitted from that direction. The above explanation is intended merely as an indication of the varied driving connections which may be established to operate a device of the character disclosed herein.

Keyed to shaft 40 upon that portion thereof which lies forwardly of the head 26 of pintle 25 are a pair of bevel gears 43 and 44. The hub of the former gear and a part of the gear itself lie within the recess 27 of the knuckle member 15. Preferably integral with said member and extending outwardly therefrom in a direction which may be normal to the axis of shaft 40 is a bearing sleeve or housing 37 within which is journaled a shaft 45 carrying a bevel gear 46 which meshes within recess 27 with bevel gear 43. The exposed extremity of shaft 45 is recessed at 42' in a manner corresponding to the treatment of shaft 40 and is thereby adapted to receive a driving connection from any suitable source. It will be obvious, therefore, that through the provision of a plurality of angularly related drive shafts each provided with an exposed end adapted to receive a driving connection, this device will normally be adapted to receive power from the direction of the end of a table upon which it may be mounted and, in various positions of adjustment upon the table, it may simultaneously be adapted to receive power either from the front or from the rear of such a table.

Having described the base of the device together with the power transmitting mechanism mounted thereon and the hinged connection between the base and the frame 11, I will now discuss the frame and related parts prior to a disclosure of the means by which motion is transmitted from the shafting in the base to the spindle which is mounted in the frame.

The frame 11 provides at 48 a tapered bearing opening within which a correspondingly formed spindle 50 is journaled. A platen or table 51 having a working surface 52 may be and, in the present embodiment of this invention, is an integral part of spindle 50. The platen or table 51 projects axially from a close fitting sleeve 53 which is integral with frame 11. The projection of the table from said sleeve is sufficient to provide for the T slots shown at 54 wherein the heads of bolts may be introduced to secure work in an operative position upon said table or platen. This construction is of advantage because when the device is operated in the position in which it appears in the accompanying drawings the T slots permit work to be clamped rigidly to the spindle and, when the frame 11 is rotated about pintle 25 to bring the axis of the spindle to a vertical position and the working face 52 of platen 51 horizontal, the table may then be used if desired in precisely the same manner as a rotary table attachment which is widely known in the art. I have provided in the frame casting 11 an integral lip portion 55 between which and the sleeve 53 is formed a trough 56 adapted to receive oil and chips when platen 51 is in use as a table. A packing ring 57 in a suitable groove in the table wipes the interior surface of sleeve 53 and prevents coolent and chips from reaching the interior mechanism of this device.

Rigidly connected to the rear of table 51 is a worm gear 60 which is preferably peripherally recessed as shown in Figure 4 to receive the corresponding shoulders 61 of the table. A plurality of axially extending pins 62 secure the table and worm gear 60 together. The worm gear is driven by a worm 63 which, in turn, is actuated from the shafts 40 or 45 through mechanism hereinafter to be described.

A nut 65, threaded to the rear end of the tapered spindle 50, maintains the spindle properly positioned within its bearing. Where the use of a center is desirable, the center pin 66 which tapers rearwardly may be introduced into the axially extending and correspondingly formed opening 67 of spindle 50 wherein it is retained frictionally and by the pressure of the work.

The key slot 49, Figure 3, is formed in the bottom of the base 10 in such a position as to cooperate with a rib of the milling machine table to bring the center pin 66 into proper relation with the milling machine. Thus, slot 49 having been formed in the base prior to the mounting thereof of the frame 11, it follows that the cooperating knuckles of the two members must be interengaged with regard not only to the securing of a perfect fit in the manner which has been described, but also with regard to the maintenance of the members in predetermined relation along their pivoting axis. Thus, under these circumstances, the filling means or washers will have to be arranged with particular regard to the maintenance of the proper relation between the two main members 10 and 11.

It will be noted that in the present embodiment of this invention the worm gear 60 comprises an annulus which is fast to the spindle adjacent the working end thereof and at the periphery of said end. When it is desired to lock the spindle in any given position of rotative adjustment, the inner surface 68 of the annular gear 60 is arranged to receive the clamping pressure of an expansible split ring 70. The extremities 71 of said ring converge rearwardly as shown in Figure 6 and between them is fitted the wedge-shaped head 72 of a bolt or pin 73. The rear extremity 74 of said pin is extended through an apertured upstanding ear 75 between which and the body of frame casting 11 is confined a nut 76 in threaded engagement with bolt 73. The arrangement is such that by the rotation of nut 76 the bolt 73 may be advanced or retracted axially to or from the platen. When the bolt is retracted as aforesaid, its wedge-shaped head 72 acts upon the correspondingly converging end faces 71 of the split ring 70 and thereby expands said ring symmetrically into contact with the inner surface 68 of the annular gear 60. In this way, the gear, together with the spindle and all related parts may be frictionally bound against movement in either direction and inasmuch as the ring must expand equally in opposite directions from the center line of the device there will obviously be no tendency for the clamping operation to cause any movement whatever of the spindle. Such an arrangement makes for accuracy since an adjustment once obtained will not be disturbed when the parts are clamped.

This particular type of clamp has the further advantage that it tends to co-operate with the tapered spindle and spindle bearing to produce an unusually rigid clamping action. The wedge portion 72 and 73 has sides which converge rearwardly. Hence the pin is moved toward the small end of the spindle to expand the clamping ring 70. Obviously, the ring will pass through a succession of degrees of frictional engagement with the spindle before the ultimate desired clamping pressure is reached. The ring is floated within its chamber and should it move at all in effecting clamping action, it could only move rearwardly with the pin. In such a case, the spindle would tend to be drawn rearwardly into a closer fit in its tapered bearing, thereby producing an added clamping action.

The mechanism which drives worm gear 60, the spindle and related parts will now be described commencing with the mounting for worm 63 and the shaft thereof.

The worm 63 may be, and is shown to be, integrally connected with a worm shaft 78 which is provided with a bearing at 79 in a bearing block 80. A disk 81 seats against a shoulder in a recess 82 in the upper portions of said block and is held in place by a ring nut 83 in threaded engagement with the block. The upper and lower surfaces of disk 81 provide races for ball bearings. A lower opposing race 84 seats against a shoulder on the worm shaft 78 and an upper race 85 is backed by a split nut 86 in threaded engagement with worm shaft 78 and adapted to be clamped in any desired adjustment by a transversely extending screw 87. The arrangement is such that the nut 86, upon release of clamping screw 87, may be tightened in a readily understood manner to compress upper and lower races 85 and 84 in the direction of the central race or disk 81, thereby taking up all end thrust through the ball bearings 88. Since the central disk 81 is fixed to block 80 and the upper and lower ball races are confined against axial movement upon said shaft away from said disk, it will be obvious that end thrust acting upon the worm shaft 78 is fully cared for by the described arrangement.

Securely fastened to the upper exposed end of worm shaft 78 by key 89 or otherwise is an arm 90 radially slotted at 91. A handle 92 is adjustable longitudinally of said arm in the slot 91 and is provided with a retractible pin 93, headed at 94, and normally maintained in the position indicated in Figure 2 by a spring 95. Pin 93 is provided with a reduced portion 96 which is adapted for insertion into a selected aperture 97 of an indexing plate 98 of common and well known construction. In fact, this entire arrangement of a radially slotted arm provided with a manually adjustable and retractible pin movable over the surface of an indexing plate is very well known in the machine tool art.

The plate 98 is rotatable through mechanism hereinafter to be described and may be maintained in a selected position of rotative adjustment by means of a pin 100, axially slidable through a sleeve 101 which is preferably integral with the bearing block 80 in which the worm shaft 78 is turned. Pin 100 has a reduced portion 102 adapted to penetrate from beneath a selected opening 97 in the index plate. Said pin 100 is also provided with a radially projecting handle 103 by means of which the pin may be manipulated manually to and from engagement with the plate. An axially extending slot 104 in the sleeve 101 receives the handle when the pin is to be lowered out of engagement with plate 98. When the pin is to be maintained in engagement, it is rotated slightly upon its axis thereby bringing the handle 103 out of registry with slot 104 and maintaining the pin in an elevated position.

Fitting closely upon the worm shaft 78 immediately beneath the slotted arm 90 is a bushing 105 upon which is journaled a gear 106. The index plate 98 is removably secured to the hub portion 107 of said gear by means of suitable screws or pins 108. It is customary to provide a number of index plates each having apertures 97 regularly spaced in circles thereon with different degrees of separation between the adjacent apertures of each circle. By means of the provision of the screws or pins 108 it is customary to make these plates interchangeable upon the gear 106 which drives them.

It will be understood that when the gear 106 is actuated the index plate 98 secured thereto will move therewith and will impart its motion through pin 93 to the arm 90 and thence to worm shaft 78. The worm shaft is, however, susceptible of independent operation when the pin 93 is manually retracted from engagement with an aperture 97 of the index plate. For the assistance of the operator in determining the degree of movement of the worm shaft independently of the index plate, a pair of radially projecting straight edges 110 may be provided if desired and may conveniently be journaled from bushing 105.

It is particularly to be noted that all of the rotative parts which have just been described, including gear 106 and index plate 98, are concentric with worm shaft 78 and being journaled therefrom are dependent on said shaft for their position. This is important for the reason that worm shaft 78 together with all of the parts attached thereto and dependent thereon as aforesaid are bodily adjustable.

The lower portion of bearing block 80 is enclosed in a housing which may be separable, as shown, into two parts upon the section on which Figure 2 is taken. That portion of the housing which lies toward the rear of the spindle from the section indicated at 2—2 in Figure 1 is preferably integral with frame 11 and is herein designated by the reference character 109. The portion 109 of the frame casting is apertured at 210 to receive the reduced portion 111 of a bearing block 112 which may be secured in place by countersunk cap screws such as that shown at 113. Within the bearing block is journaled a shaft 115 which, at its lower end, carries a bevel gear 116 meshing with the gear 44 upon the transverse drive shaft 40. Shaft 115, at its upper end, carries a pinion 117 which may, as shown, be integral therewith. This pinion meshes with gear 106 upon worm shaft 78 and thereby completes the driving connection between the angularly related driving shafts in the base of the device and the spindle which is located in frame 11.

By way of summary, this driving connection will be repeated briefly at this point.

Power is received into the device through either of the coupling portions 42 or 42′ of the angularly related and interconnected drive shafts 40 and 45. From drive shaft 40, motion is transmitted through bevel gears 44 and 116 and shaft 115 to pinion 117 which drives gear 106. This last mentioned gear is supported from and is journaled concentrically with worm shaft 78 and drives any one of a set of interchangeable index plates 98. The adjustable pin 93 upon arm 90 may be engaged with any selected aperture of an index plate 98 to receive motion therefrom and to transmit such motion through worm shaft 78 to the worm 63. The pin and arm, taken with the indexing plate, comprise one well known form of manually operable indexing clutch mechanism. The worm meshes with worm wheel 60 which is secured to the platen portion of the spindle.

The portion 109 of frame casting 11 which supports bearing block 112 is also extended integrally in the form of a collar 109′ about the extremity of shaft 40. A plug 114 closes the end of the collar 109′ and provides a bearing for the reduced extremity of shaft 40 in the manner clearly shown in Figure 3. The arrangement is such that the collar 109′, being integral as aforesaid with the frame casting 11, constitutes in reality one additional knuckle element of the hinge joint which has already been described. It differs from the knuckle elements only in that no clamping pressure is exerted through it and it is free to rotate with the frame casting 11 about the pintle member 25.

The bearing block 112 which has been described above as providing a bearing for intermediate shaft 115 is shouldered at 118 to provide a seat for a cap 120 which houses pinion 117 and also extends integrally about gear 106. The bearing block 80 in which the worm shaft is journaled is shouldered at 118 to receive the cap member 120 with a loose fit. The cap member also extends loosely between said bearing block 80 and the sleeve 101 in which the pin 100 is slidable. It has already been suggested that the entire bearing block 80, together with the worm shaft, worm and related parts, is bodily adjustable and the object of providing a loose fit between cap member 120 and the bearing block 80 is to permit of the aforesaid adjustment.

It has been pointed out that the entire structure which supports the intermediate shaft 115 is connected integrally with the frame member 11 to the rear of the clamp in which section 2—2 is taken. Forwardly of said plane, to wit, in the direction of the platen face 52 therefrom, the housing for the worm shaft 78 is completed by a removable segmental housing member 121 which is aligned by means of dowels 122 and is secured in place by means of a number of bolts or cap screws 123. The segmental removable housing member 121 together with the permanent portion 109 of the housing provides a central opening 124 which, at all points, is of greater diameter than the corresponding portions of bearing block 80, whereby a limited freedom of movement of said bearing block within the enclosing housing is permitted. Preferably the opening 124 is of a size adequate to permit the bodily removal of worm 63 therethrough. For this reason, the portion 121 of the housing need not, if desired, be made independently removable from the remaining portions 109 thereof.

A pivot pin 125 passes through a portion of bearing block 80 and through the housing elements 109 and 121 upon either side thereof. The axis of pivot pin 125 is normal to the axis of worm shaft 78 and is parallel to the axis of the spindle and of the worm gear 60, the arrangement being such that upon this pivot pin the worm 63 can oscillate to and from the worm gear in the plane thereof and substantially on a radius thereof. A gasket 126 of felt or other like compressible material is preferably interposed between the shoulder 127 of bearing block 80 and the underlying upper surface of housing members 109 and 121.

The space within which the worm, worm shaft and related parts are adjustable may, if desired, be very limited since, with care, the worm can be made to fit the worm gear with great accuracy. I have found, however, that despite the exercise of maximum care, an absolutely perfect fit between the worm and worm gear cannot be obtained. The pivotal mounting of the worm shaft, worm and related parts permits the maintenance of a constant pressure of the worm upon the worm gear establishing their working surfaces in constant pressure contact in spite of minute variations in pitch diameters of the gear or worm and thereby prevents back lash such as might conceivably originate from this or other causes. This construction also permits of the adjustment of the worm in the direction of the gear to compensate for wear.

It will be noted that the gear 117 with its driving shaft 115 is not bodily movable with respect to the integral portion 109 of frame 11. Gear 106, however, which meshes with gear 117 is movable with the parts adjustable as aforesaid. Accordingly, when the worm 63 adjusts itself or is adjusted with respect to worm wheel 60 some slight displacement of gear 106 will take place with respect to gear 117. A study of the arrangement of the parts, however, will disclose the fact that such a displacement will not only be very slight in amount but will take place in a direction such that even a much greater displacement could occur without any perceptible change in the degree of mesh of these gears.

In threaded engagement with the housing elements 109 and 121 is a tubular screw 130 upon which is threaded a lock nut 131. The inner margin 132 of said screw abuts against the bearing block 80 immediately adjacent worm 63. This screw, therefore, comprises an adjustable positive stop for limiting the bodily movement of the worm, worm shaft and related parts away from the worm gear about pivot pin 125. Movable within the cylindrical aperture 134 of tubular screw 130 is a plunger 135 which is normally thrust outward by means of a compression spring 136. This spring is preferably of sufficient strength to maintain the worm in substantially constant pressure contact with the worm gear. Other types of pressure applicators might be used for this purpose. Obviously, within limits, the spring alone will prove adequate to maintain the worm and worm gear within the desired closely fitted relation but in a tool of this character where a maximum degree of accuracy is sought, it is considered preferable to add to the spring the adjustable stop 130. This feature makes it unnecessary to provide a spring capable of withstanding the maximum thrust between the worm and worm wheel. The stop 130 will at all times maintain the parts in their proper relation with the same degree of accuracy which it is possible to obtain in the use of any device of this character which has heretofore been made. The pressure applicator 136 eliminates back lash and thus makes for greater accuracy, particularly during the manual adjustment of the spindle, when absolute accuracy is most desirable.

It is not considered necessary to provide means for adjusting the compression of spring 136. Any such means may be provided, however, if such an arrangement may be found to be desirable.

In a machine tool attachment constructed in the manner disclosed herein, those skilled in the art will find and appreciate advantages which have heretofore been unknown in devices of this character.

It has already been pointed out that the spindle and platen are adapted, in any position, to support work at an unusually low elevation above the base. The entire device is only slightly higher than the diameter of the platen itself and when the platen is swung to its horizontal position for use as a rotary table for circular milling or related function, the construction is such that the platen will lie at substantially the elevation above the base of any circular table attachment above its base. The fact that the work support is very low contributes materially to the rigidity of the entire device.

The low height of the work support is made possible primarily by the use of the peculiar clamping hinge between the frame and the base. By providing a plurality of knuckles upon each of the hingedly related members, I have devised a clamp by means of which a relatively great rigidity can be obtained with the use of relatively small surfaces in frictional engagement. It will be obvious that if the knuckle members were enlarged to provide frictional surfaces of large area the height of the entire attachment would be correspondingly increased. The construction herein disclosed is such, however, that instead of employing one or two frictionally related surfaces to accomplish the clamping action by means of which the frame is locked in any given position of adjustment, I have provided a multiplicity of such surfaces through which pressure is exerted by a single clamping device. The contact between the abutting surfaces of adjacent knuckles is so perfect that substantially the entire clamping action is obtained by a yielding of the metal itself in a manner which has previously been explained. As a result, the pressure applied through pintle 25 is transmitted to all of the knuckle members clamped by said pintle to bring their abutting surfaces into frictional engagement with equal amounts of pressure in each case. Furthermore, the pressure upon each pair of abutting surfaces will be substantially equal to the entire pressure exerted by the clamp. Thus, through the application of a given clamping force simultaneously to a plurality of frictionally related surfaces a rigidity of clamping action is obtained which is approximately equivalent to that which might be obtained through the use of a much higher clamping force upon a correspondingly lesser number of surfaces. Through this perfection of clamping action I have eliminated the usual necessity for having the clamping surfaces extend to comparatively great distances from the axis about which hinged movement takes place.

The particular type of clamping hinge disclosed herein is regarded as being of great importance in a dividing head and particularly in a dividing head adapted for use also as a rotary table attachment. It has already been explained herein that one of the objects of this invention is to provide a dividing head which will combine unusual rigidity in its several adjustments with an unusually low height. The clamping hinge above discussed satisfies the specified object more completely than any other construction of which I am aware.

A further factor contributing to the low height of the work supporting platen is found in the fact that the worm is not disposed beneath the worm gear. The disposition of the parts is such that an unusually large worm gear is used thereby tending to increase the accuracy of the dividing engine. The use of a large worm gear, however, does not increase the height of the device since the worm is positioned in the angle between the periphery of the worm gear and the base. The particular disposition of the worm shaft and worm also renders more convenient the use of the manually operable indexing clutch mechanism since the angle is such as to make the reading of the index plate extremely easy in any position of adjustment of the frame and spindle.

Not only is the worm gear large, thereby promoting accuracy in the dividing engine, but the gear is also located immediately adjacent the work supporting portion of the spindle. Such a construction minimizes torsional effects and also makes possible the use of the particular spindle clamping device herein illustrated.

Just as power is applied to the spindle immediately adjacent its working face, so also is the clamping action applied to the same part of the spindle. It has already been pointed out that the construction of clamp herein disclosed is a particularly valuable one in that the clamping force is applied to the spindle equally and in opposite directions. The symmetrical application of the clamping force is such that there is absolutely no tendency for the application of the clamp to rotate the spindle in either direction. Also, as heretofore pointed out, such tendency to produce axial spindle movement as may exist, tends rather to bind the spindle more tightly than to release the spindle in its tapered bearing. Consequently, great accuracy is possible in the use of a device of this character.

It is desired again to call attention to the fact that the worm shaft and worm together with related parts are bodily adjustable with respect to the worm wheel. The positive stop which is provided for the bearing member carrying these parts is adapted to maintain the worm and worm gear in mesh with an accuracy at least equal to that which is possible in the best constructions heretofore known. The worm and worm gear will, of course, be machined with the greatest possible accuracy and consequently even without the provision of the spring 136 a dividing engine embodying this invention will be as accurate as any prior construction. Where spring 136 is used, all wear will be compensated for automatically by the pressure of the spring and the worm will furthermore be automatically pressed in the direction of the worm wheel to maintain a close mesh between these two gears in spite of any unavoidable inaccuracies which may exist in either or both. Between gears which are thus maintained in mesh, there is almost no possibility for back lash to occur.

In a machine tool attachment which is designed to serve a wide variety of purposes, it is obviously a great advantage to be able to apply power to the attachment from a plurality of points. It may even be desirable under some circumstances to apply power to one of the shafts disclosed in connection with this invention and to use the other shaft as a power take off for transmitting motion to some other device. The arrangement of the power shafts herein disclosed is such that with the attachment in any normal or ordinary position of adjustment upon a machine tool table, one of the shafts will always project in the direction of the end of such a table and will be adapted to receive power from the motion transmitting connections which ordinarily exist at a table end in machine tools. In some positions of the attachment, power may be taken simultaneously or alternatively from the end and from the rear margin of such a table, and to those skilled in the art this feature will recommend itself as an obvious advantage.

Having thus described my invention and indicated its advantages, I will hereby point out the particular features in which my invention differs from the prior art.

I claim:

1. In a machine tool attachment, the combination with a pair of hingedly related members, of a central lug connected with one member, a set of clamping lugs connected with the other member and disposed adjacent opposite sides of said central lug, a second set of clamping lugs disposed outside of said first set, washers interposed between certain of said lugs, the adjacent faces of washers and lugs being accurately surfaced and closely fitted, and a clamp arranged to act throughout the series of said lugs and washers whereby to set up clamping pressures through said second and first sets of clamping lugs upon each other and said central lug.

2. In a machine tool attachment, the combination with base and frame members, of a clamp hinge connection therebetween comprising a series of lugs in which outer and central lugs are connected with one member and intermediate lugs with the other, pressure transmitting washers between certain of said lugs, said lugs and washers being accurately surfaced and in intimate contact throughout the series, and a pintle extending through said series of lugs and provided with clamping means acting through said outer lugs upon all the lugs of said series.

3. In a machine tool attachment, the combination with base and frame members, of a clamp hinge connection therebetween comprising a series of lugs in which outer and central lugs are connected with one member and intermediate lugs with the other, pressure transmitting washers between certain of said lugs, said lugs and washers being accurately surfaced and in intimate contact throughout the series, and a pintle extending through said series of lugs and provided with clamping means acting through said outer lugs upon all the lugs of said series, a work support upon said frame adjustable therewith between horizontal and upright positions, and a drive shaft for said work support extending through said pintle.

4. In a machine tool attachment, the combination of a base member and a frame member in hinged connection for movement about a given axis, a plurality of lugs upon each of said members in complementary face contact and in alternate arrangement with one another, a tubular pintle pivoting said lugs for relative movement upon said axis, a work spindle supported by said frame member, a spindle drive shaft extending through said pintle from one end to the other of said series of lugs, motion transmitting connections at one end of said drive shaft leading to said spindle, and a power receiving coupling at the other end of said drive shaft.

5. In a machine tool attachment, the combination with a base member and a frame member relatively movable about a common axis, of a clamping hinge connection between said members including a plurality of lugs carried by each member and provided with complementary friction bearing surfaces in operative contact along said axis in planes normal thereto, a tubular pintle connecting said lugs, a clamp exerting pressure in the direction of said axis, said lugs being so closely fitted that said clamp is adapted to flex them sufficiently to establish a frictional engagement between opposing friction surfaces through the series of lugs, a spindle drive shaft extending through said pintle from one end of said series to the other and provided at one end with motion transmitting connections to said spindle and at the other end with a power receiving coupling.

6. In a machine tool attachment, the combination with two members relatively movable about a common axis, a work spindle supported by one of said members, a spindle drive shaft extending along said axis through said members, and motion transmitting connections between said shaft and spindle including a manually operable indexing clutch for the optional hand operation of the spindle.

7. In a machine tool attachment, the combination of two members relatively movable about a common axis, a work spindle supported by one of the members, a spindle drive shaft extending along said axis through said members and adapted to receive power for the actuation of the spindle, motion transmitting connections between said shaft and said spindle including indexing clutch mechanism alternatively operable manually for effecting fractional revolutions of the spindle, and means for determining the magnitude of such fractional revolutions.

8. In a machine tool attachment the combination of two members relatively movable about a common axis, a work spindle supported by one of the members, a spindle drive shaft extending along said axis and adapted to receive power from an external source for the actuation of said spindle, motion transmitting connections between said shaft and spindle including an indexing clutch mechanism optionally manually operable for effecting fractional revolutions of the spindle, together with a clamp available to secure said spindle against rotation.

9. A machine tool attachment including a pair of members provided with knuckle portions having parallel clamping faces and aligned apertures upon a common axis intersecting said faces one of said members comprising a base and the other a work support mounting, a tubular pintle headed at one end for engagement with a knuckle of one of said members and threaded adjacent the other end, a nut upon said pintle and adjustable thereon to exert a clamping pressure through a plurality of knuckle portions, a work support upon said mounting member and a power transmitting shaft extending through said pintle and operatively connected with said work support.

10. In a machine tool attachment the combination with a base plate provided on an intermediate portion with upstanding knuckles spaced at intervals transversely of said plate, of a frame member provided with interacting knuckles extending between the knuckles of the plate, all of said knuckles being apertured upon a common axis, a tubular pintle extending through the apertures of said knuckles whereby said frame and base plate are hingedly related upon the axis of said pintle, means for exerting clamping pressure along the axis of said pintle to bind said knuckles upon each other, a drive shaft within said pintle, a driven member journaled in the frame, and power transmitting connections adapted to deliver power from said drive shaft to said driven member irrespective of the hinged adjustment of said frame with respect to said base plate.

11. In a machine tool attachment the combination with a base plate provided with upstanding knuckle elements transversely spaced and provided with apertures in transverse alignment, of a frame member provided with complementary knuckle elements similarly apertured and provided with plane surfaces closely abutting end surfaces of the knuckle elements of the base, a tubular pintle engaged with one of said knuckle elements and provided with a clamping device adjustably engageable with another of said elements, a shaft extending through said pintle, and a work supporting device journaled in said frame and provided with power transmitting connections adapted to receive power from said shaft.

12. In a machine tool attachment the combination of a pair of members hingedly mounted upon a hollow pintle and each provided at intervals along said pintle with knuckle elements having their opposite surfaces engaged by corresponding surfaces of complementary elements of the other member, a driven element rotatably mounted upon one of said members, a drive shaft for said element extending through said pintle, and a clamping nut adjustable upon the pintle and arranged to exert clamping pressure through a plurality of said knuckle elements, whereby their engaged surfaces may be brought into binding frictional relation.

13. A machine tool attachment including a base and frame provided with complementary knuckle elements correspondingly apertured, a tubular pintle passing through the apertures of said elements, a clamping nut adjustable with respect to the pintle and arranged to transmit clamping pressure through a plurality of said knuckle elements, whereby their abutting surfaces may be brought into frictional engagement, a power shaft extending through said pintle, a spindle rotatably supported in said frame, and motion transmitting connections carried by said frame and arranged to receive power from said shaft irrespective of the position of adjustment of the frame and to transmit such power to the spindle.

14. A machine tool attachment including a base and frame provided with complementary knuckle elements correspondingly apertured, a tubular pintle passing through the apertures of said elements, a clamping nut adjustable with respect to the pintle and arranged to transmit clamping pressure through a plurality of said knuckle elements, whereby their abutting surfaces may be brought into frictional engagement, a power shaft extending through said pintle, a spindle rotatably supported in said frame, and motion transmitting connections carried by said frame and arranged to receive power from said shaft irrespective of the position of adjustment of the frame and to transmit such power to the spindle, said motion transmitting connections including a manually operable indexing clutch mechanism.

15. A machine tool attachment including a base and frame each provided with a plurality of knuckles connected by a pintle and constituting a hinged connection through which clamping pressure may be exerted, in combination with a spindle mounted in said frame for adjustment therewith about said pintle, a platen providing a radially extending working face for said spindle, and a removable center pin projecting axially from said platen.

16. In a machine tool attachment adapted for angular adjustment bodily upon a milling machine table, the combination with a base and a work support hingedly and rotatably mounted thereon, of a drive shaft for said work support extending axially of said hinge and provided at one side thereof with a coupling, a secondary drive shaft connected with the first at an angle corresponding approximately to the angle of adjustment for which said attachment is designed and disposed at the other side of the hinge from said coupling, said secondary drive shaft being provided also with a coupling and the coupling portions of the respective drive shafts being arranged to project in approximately corresponding positions in the various positions of bodily angular adjustment of the attachment, whereby one or the other may be presented to a fixed source of power on a machine tool table.

17. The combination with a pair of members provided with correspondingly apertured complementary knuckle elements having mutually contacting surfaces normal to the axis of said apertures, of a tubular pintle extending through said apertures and providing a clamp whereby pressure may be exerted through a plurality of said knuckle elements to bind said surfaces in frictional engagement, a drive shaft extending through said pintle, a second drive shaft disposed at an angle to the first drive shaft and operatively connected therewith, a spindle supported from one of said members, and motion transmitting connections between said spindle and one of said drive shafts, whereby said spindle may receive power optionally from a plurality of sources.

18. In a machine tool attachment the combination with a base member and a frame member each provided with a plurality of complementary knuckle elements correspondingly apertured and having abutting surfaces normal to the axis of said apertures, means for exerting clamping pressure through a plurality of said knuckle elements whereby said surfaces may be bound in frictional engagement, a drive shaft extending axially through said apertures and provided with an exposed coupling portion, a second drive shaft angularly disposed with reference to the first and operatively connected therewith, said second drive shaft being also provided with an exposed coupling portion, motion transmitting connections movable with the frame about the axis of the first drive shaft and adapted to receive power therefrom irrespective of the position of the frame, and a spindle rotatably supported from said frame and arranged to be driven through said motion transmitting connections 19. In a machine tool attachment the combination with base and frame members relatively adjustable about a given axis and providing complementary lugs having opposing surfaces normal to said axis and in contact with corresponding surfaces of adjacent lugs, of means for exerting clamping pressure through a plurality of said lugs, whereby said surfaces may be frictionally bound, a drive shaft concentric with said axis, a second drive shaft, a spindle carried by said frame, and motion transmitting connections for said spindle adapted to receive power from either of said drive shafts irrespective of the position of adjustment of the frame about said axis.

20. In a machine tool attachment, the combination of two members relatively movable about a common axis, a work spindle supported by one of the members, a spindle drive shaft supported by the other of the members, a hinged connection between said members through which said spindle drive shaft extends, a power coupling on said drive shaft at one end of said hinged connection, and a power coupling for said drive shaft, and motion transmitting connections to said spindle at the other end of said hinged connection.

21. In a machine tool attachment, the combination of two members relatively movable about a common axis, a work spindle supported by one of the members, a spindle drive shaft supported by the other of the members, a hinged connection between said members through which said spindle drive shaft extends, a power coupling on said drive shaft at one end of said hinged connection, and a power coupling for said drive shaft, and motion transmitting connections to said spindle at the other end of said hinged connection, said power couplings being disposed substantially at right angles to each other.

22. In a machine tool attachment, the combination of two members relatively movable about a common axis, of a rotatable work table mounted in one of said members, a table drive shaft journaled in the other member, a driving element geared to said table and rotatable in a plane substantially parallel to a plane including the axis of said drive shaft, indexing mechanism in actuating connection with said element, and a motion transmitting train connecting said drive shaft with said indexing mechanism and adjustable with said table about said axis, whereby to maintain driving connections to said table in all positions thereof.

23. In a device of the character described, the combination with a base and a frame in pivotal connection therewith, of a table rotatably mounted in said frame for bodily movement about the pivotal axis of said connection, a drive shaft concentric with said axis, a driving element geared to said table and substantially tangential thereto, indexing mechanism in actuating connection with said driving element, and means including a gear on said drive shaft and a gear on said indexing mechanism for providing constantly available motion transmitting connections between said drive shaft and said indexing mechanism, said indexing mechanism being mounted for movement with the member in which said table is journaled.

24. In a machine tool attachment the combination with a hingedly related base and frame providing positive stops adapted to limit the frame to 90 degrees of movement with respect to the base, of a work table rotatably supported from the frame, a plurality of drive shafts supported from the base, and power transmitting connections available for the actuation of said table from said shafts in any position of said frame.

25. In a machine tool attachment the combination of a hingedly connected base and frame, one of which provides studs adapted to contact with the other and finished to define 90 degrees of frame movement with respect to the base, a driving element concentric with the axis of hinged adjustment between the base and frame, a driven work supporting element carried by the frame, and motion transmitting connections between said driving and driven elements.

26. A machine tool attachment including a base provided with connections adapting it for attachment to a support in a plurality of positions of angular adjustment, a rotatable work supporting member, a frame carrying said member from said base for bodily adjustment about an axis angularly related to the axis of said first mentioned adjustment, and a motion transmitting train leading to said member and provided in adjustments of said member about either of said axes with an exposed coupling member adapted to receive power from a relatively fixed source, said train having a portion aligned with one of said axes of adjustment and having a plurality of said coupling members arranged to receive power alternatively when said base is adjusted about the other of said axes.

27. A machine tool attachment constituting a rotatable work support mounted for bodily adjustment about a plurality of axes, in combination with a driving train connected with said support for the rotation thereof and adapted, despite the adjustment of said support about any of a plurality of axes, to provide an exposed coupling member adapted to receive power from a given direction, one of said axes being concentric with a portion of said train and said train including a plurality of said exposed coupling members, whereby to provide for the reception of power from such portion when said support is adjusted about the other of said axes.

28. An indexing mechanism including hingedly related base and frame members each provided with a plurality of knuckles complementary to those of the other, said elements being provided with abutting surfaces, means for exerting pressure through a plurality of said knuckles, a rotatable work supporting element carried by said frame member, and driving connections for said element including indexing clutch mechanism.

29. In a dividing head, the combination with two members relatively movable around a common axis, of a plurality of knuckles on each member spaced along the axis to receive a complementary knuckle of the other member, the abutting surfaces of said complementary knuckles being disposed in planes normal to said axis and in closely fitted relation to contiguous surfaces of other knuckles, a clamp including a pintle extending through said knuckles and arranged to exert simultaneously a clamping force pressing a plurality of said abutting surfaces into frictional engagement, a revoluble work support carried by one of said members, and driving connections for said work support including an indexing clutch mechanism.

30. In a machine tool attachment, the combination with a base and a table support pivoted for angular adjustment with respect to said base upon a horizontal axis and required to be maintained at a low elevation thereon in its various positions of adjustment, of a series of compression elements having bearing surfaces in mutual contact and accurately finished in planes to which said axis is normal, and a clamp acting axially on elements at the ends of said series and adapted to establish re-action pressures between said elements throughout the series, a number of mutually spaced elements in said series being connected to said base and another set of mutually spaced elements being connected to said support, and all of said elements being fitted with such accuracy as to transmit the pressure of said clamp without material deflection of said surfaces from their respective planes, whereby clamping pressure is established simultaneously throughout said series between elements connected respectively with said base and support to maintain said support in a required position of adjustment with a clamp of relatively small radius.

31. In a machine tool attachment, the combination with two members relatively movable about a common axis, of a series of complementary knuckles including a plurality of knuckles connected with each member and connected with respective members in alternation, a single clamp acting throughout said series of knuckles, and clamping faces at the sides of each such knuckle engaged by like faces of adjacent knuckles upon either side thereof except at the ends of the series, certain of said knuckles including portions integral with said members and other portions separable therefrom and adapted to maintain said surfaces in closely fitted relation for the axial transmission of the pressure of said single clamp throughout said series to establish clamping pressures simultaneously between the several alternating knuckles therein.

32. In a machine tool attachment, the combination with a base member and a supporting frame member, of a clamping hinge connecting said members and comprising a central compression element integral with one of said members, a first pair of compression elements connected with the other of said members and positioned on either side of said first element in pressure transmitting relation thereto, a second pair of compression elements connected to said one member and spaced to receive the elements of the first pair in pressure transmitting relation thereto, a third pair of compression elements connected with said other member and spaced to receive the elements of the second pair in pressure transmitting relation thereto, and a pintle extending throughout said elements and provided with pressure means for clamping said elements simultaneously into frictional engagement with each other, whereby to restrain said members from relative movement about said pintle.

33. In a machine tool attachment, the combination with a base member and a supporting frame member, of a clamping hinge connecting said members and comprising a central compression element integral with one of said members, a first pair of compression elements connected with the other of said members and positioned on either side of said first element in pressure transmitting relation thereto, a second pair of compression elements connected to said one member and spaced to receive the elements of the first pair in pressure transmitting relation thereto, a third pair of compression elements connected with said other member and spaced to receive the elements of the second pair in pressure transmitting relation thereto, and a pintle extending throughout said elements and provided with pressure means for clamping said elements simultaneously into frictional engagement with each other, whereby to restrain said members from relative movement about said pintle, said first mentioned element being comparatively rigid and unyielding and said second pair of elements being relatively flexibly connected to said one member.

34. In a machine tool attachment, the combination with a pair of relatively hingedly movable members, of compression elements arranged in a series including a plurality of elements connected with each of said members, elements connected to the respective members being in alternation, a pintle extending through said compression elements and providing a pivot for the relative movement of said members, clamping means acting axially of said pintle upon elements at the ends of said series, and bearing surfaces on said elements accurately finished to planes at right angles to the axis of said pintle irrespective of the spacing of said elements, certain of said elements being interposed between elements connected to said members and provided with complementary accurately finished bearing surfaces, whereby to render said elements substantially continuous in said series and thereby adapted to transmit clamping pressure throughout said series without materially deflecting said elements.

35. In a machine tool attachment, the combintion of a base member and a frame member, and means for hingedly connecting said members, said means comprising a series of apertured parallelly extending lugs on each of said members, the lugs of one series being interposed between those of the other series to bring the apertures of all of the lugs into alignment, an apertured washer inserted between adjacent lugs with its lateral faces in such proximity to the lateral faces of the lugs as to insure a close fit between all the interengaged lugs of both series, and a clamping member extending through said apertures and adapted through relatively slight clamping movement to draw all of the opposed faces into frictional locking engagement, the lateral faces of said lugs being of relatively small area, for the purpose described.

36. In a machine tool attachment, the combination with a pair of hingedly related members, each providing a plurality of complementary lugs intersected by the axis upon which said members are hingedly adjustable, a washer interposed between certain adjacent lugs, the abutting faces of said lugs with each other and with said washer, and the faces of said washer being accurately surfaced in parallel planes normal to said axis and closely fitted, the disposition of said washer being such as to maintain said members in predetermined relation along said axis, and a clamp operable to exert pressure through a plurality of said lugs and said washer, whereby said faces may be brought into frictional engagement.

37. In a machine tool attachment, the combination with a pair of members, one of them comprising a base, and the other a work support, of a hinge connecting said members and including a plurality of lugs formed integrally with one of said members and provided with opposite friction surfaces, a plurality of complementary lugs formed integrally with the other of said members and providing complementary friction surfaces for some of the surfaces of said first mentioned lugs, filling means accurately fitted between said first mentioned lugs and said second mentioned lugs, the disposition of said filling means being such as to maintain said members in predetermined relation along the pivoting axis of said members, and a clamp operating on certain remote lugs through other lugs intermediate thereof, and adapted to bring all of said friction surfaces simultaneously into operative binding engagement whereby said members may be restrained against relative hinged movement, said filling means being fitted with sufficient accuracy to enable binding frictional engagement to occur under the pressure of the clamp within the degree of yielding movement possible in said integral lugs.

38. In a machine tool attachment, the combination of a base member and a frame member, and means for hingedly connecting said members, said means comprising a series of apertured parallelly extending lugs on each of said members, the lugs of one series being interposed between those of the other series to bring the apertures of all of the lugs into alignment, an apertured washer inserted between adjacent lugs with its lateral faces in such proximity to the lateral faces of the lugs as to insure a close fit between all the interengaged lugs of both series, the disposition of said washer being such as to maintain said members in predetermined relation along the pivoting axis of said frame member, and a clamping member extending through said apertures and adapted through relatively slight clamping movement to draw all of the opposed faces into frictional locking engagement, the lateral faces of said lugs being of relatively small area, for the purpose described.

EDWARD J. KEARNEY.